US006640568B2

(12) United States Patent
Shirota et al.

(10) Patent No.: US 6,640,568 B2
(45) Date of Patent: Nov. 4, 2003

(54) VEHICLE AIR CONDITIONER WITH ARRANGEMENT OF TEMPERATURE DETECTOR

(75) Inventors: Yuichi Shirota, Anjo (JP); Koji Takahashi, Obu (JP); Keiichi Kitamura, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/225,003

(22) Filed: Aug. 21, 2002

(65) Prior Publication Data

US 2003/0041610 A1 Mar. 6, 2003

(30) Foreign Application Priority Data

Aug. 29, 2001 (JP) ....................................... 2001-260165

(51) Int. Cl.[7] ................................................ F25B 41/04
(52) U.S. Cl. ........................................... 62/216; 62/229
(58) Field of Search .......................... 62/216, 229, 507, 62/509, 525, 244

(56) References Cited

U.S. PATENT DOCUMENTS 5,205,347 A * 4/1993 Hughes ...................... 165/176
5,701,760 A * 12/1997 Torigoe et al. ............... 62/524
5,918,475 A * 7/1999 Sakakibara et al. ........... 62/186
5,931,020 A * 8/1999 Nakamura ................... 62/527
6,199,401 B1 * 3/2001 Haussmann .................. 62/525
6,272,881 B1 * 8/2001 Kuroyanagi et al. .......... 62/525
6,330,909 B1 * 12/2001 Takahashi et al. .......... 165/202
6,367,270 B2 * 4/2002 Niimi et al. .................. 62/133
6,449,979 B1 * 9/2002 Nagasawa et al. ............ 62/503

FOREIGN PATENT DOCUMENTS

JP 60-61331 4/1985
JP 360061331 A * 4/1985 .................. 62/208

* cited by examiner

*Primary Examiner*—William C. Doerrler
*Assistant Examiner*—Mohammad M. Ali
(74) *Attorney, Agent, or Firm*—Harness, Dickey & Pierce, PLC

(57) ABSTRACT

In a vehicle air conditioner, a temperature sensor is disposed on a tank of an evaporator to contact the tank. In addition, the temperature sensor is disposed at a tank position separated from a refrigerant inlet and a refrigerant outlet. Accordingly, a downstream space of the evaporator can be effectively used, and the size of the air conditioner can be reduced while the temperature of the evaporator can be accurately detected using the temperature sensor.

8 Claims, 5 Drawing Sheets

1 11 12 8 13 14 2 16 15 10 9 AIR UP FRONT REAR DOWN 3 4 5 7 6

VEHICLE AIR CONDITIONER WITH ARRANGEMENT OF TEMPERATURE DETECTOR

CROSS REFERENCE TO RELATED APPLICATION

This application is based on Japanese Patent Application No. 2001-260165 filed on Aug. 29, 2001, the disclosure of which is incorporated herein by reference.

FIELD OF THE INVENTION

The present invention relates to an arrangement of a temperature detector of an evaporator in a vehicle air conditioner. The present invention is suitably applied to a vehicle air conditioner having a cold storage unit cooled by an evaporator.

BACKGROUND OF THE INVENTION

In a vehicle air conditioner 100 shown in FIG. 9, a temperature sensor 104 is disposed for detecting a temperature relative to an evaporator 103 disposed in an air conditioning case 102, and a compressor or an air temperature to be blown into a passenger compartment is controlled using the temperature detected by the temperature sensor 104. Further, a cold storage unit 105 is disposed at a downstream air side of the evaporator 103 to be cooled by air from the evaporator 103, and an air mixing door 107 is disposed between the cold storage unit 105 and a heater core 106. Generally, the temperature sensor 104 made of a thermistor is attached to a downstream air side surface of a core portion of the evaporator 103, such that a detecting portion of the temperature sensor 104 is separated from the downstream air side surface of the core portion for accurately detecting the air temperature from the evaporator 103. However, because the temperature sensor 104 is disposed to be separated from the downstream air side surface of the core portion, a downstream air side of the evaporator 103 cannot be effectively used. Accordingly, a distance between the evaporator 103 and the cold storage tank 105 becomes longer, and the size of the air conditioner becomes larger.

SUMMARY OF THE INVENTION

In view of the above-described problems, it is an object of the present invention to provide a vehicle air conditioner having a temperature detector effectively detecting temperature of an evaporator, which can be formed into a small size.

According to the present invention, in a vehicle air conditioner having an evaporator for cooling air passing therethrough, a temperature detector for detecting temperature of the evaporator is disposed to contact a tank of the evaporator. Therefore, a downstream air side space of a core portion of the evaporator can be effectively used, and the size of the air conditioner can be made smaller. Further, because the temperature detector contacts the tank of the evaporator, the temperature detected by the temperature detector has a high relationship with the air temperature blown from the evaporator.

Preferably, the evaporator is disposed in the air conditioning case to approximately cross an entire air passage in cross-section, and the temperature detector is disposed between the tank of the evaporator and the air conditioning case. Therefore, the downstream air side space of the evaporator can be more effectively used.

More preferably, the tank is arranged at an upper side of the core portion, and the temperature detector is disposed on an upper surface of the tank portion. Therefore, it can prevent the temperature detector from being covered by condensed water generated on the core portion of the evaporator with a simple attachment structure. Accordingly, the temperature detector can accurately detect the temperature relative to the air temperature blown from the evaporator.

Further, the temperature detector is disposed on an intermediate tank portion that is the other tank portion of the tank, except for first and second tank portions connected to a refrigerant inlet and a refrigerant outlet. Alternately, the temperature detector is disposed on the tank at a position separated from the refrigerant inlet and the refrigerant outlet at least by a predetermined distance. Therefore, the temperature detector can stably detect the temperature of the evaporator.

When the air conditioner has a cold storage unit that is disposed at a downstream air side of the evaporator to be cooled by the evaporator, a clearance between the evaporator and the cold storage unit can be made smaller, and the size of the air conditioner can be effectively reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
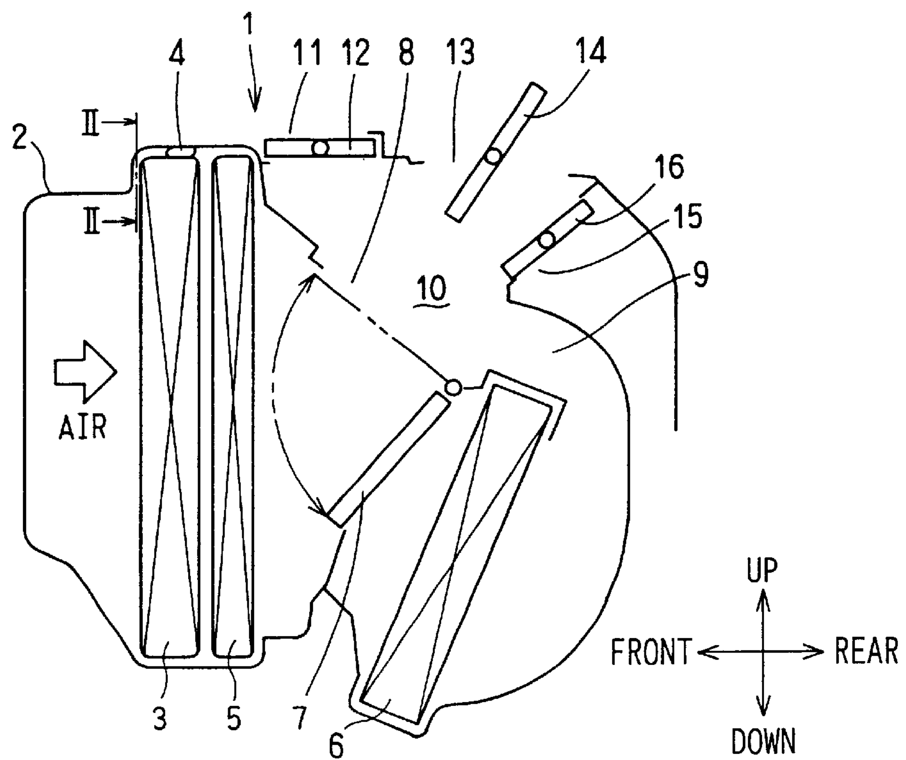
FIG. 1 is a schematic diagram showing an air conditioning device having a cold storage unit, according to a first embodiment of the present invention.

A first embodiment of the present invention will be now described with reference to FIGS. 1–4. A ventilation system of a vehicle air conditioner includes an air conditioning device 1 for controlling an air conditioning state to be blown into a passenger compartment, and a blower unit for blowing air in the air conditioning device 1. The air conditioning device 1 is disposed in the passenger compartment under a dashboard at an approximate center in a vehicle width direction (vehicle right-left direction), and the blower unit is disposed to be offset from the air conditioning device 1 to a front-passenger's seat side. The blower unit includes an inside/outside air switching box for selectively introducing inside air (i.e., air inside the passenger compartment) or outside air (i.e., air outside the passenger compartment), and a blower for blowing air introduced from the inside/outside air switching box.

The air conditioning device 1 includes an evaporator 3 (i.e., cooling heat exchanger) for cooling air, and a heater core 6 (i.e., heating heat exchanger) for heating air, which are disposed in an air conditioning case 2 defining an air passage. The air conditioning case 2 is made of a resin such as polypropylene, having a predetermined elasticity and a sufficient strength. In this embodiment, the air conditioning case 2 is divided into plural division case parts, and the plural division case parts are integrally connected by fastening member such as metal spring clips and screws after the heat exchangers 3, 6 and the other members such as doors are disposed, to construct the air conditioning device 1.

The air conditioning device 1 is mounted on the vehicle to be arranged as shown in FIG. 1 in a vehicle front-rear direction and a vehicle up-down direction. The blower unit is disposed so that air is blown into an air inlet portion at a most front side position in the air conditioning case 2.

The evaporator 3 is disposed in the air conditioning case 2 at a position immediately after the air inlet portion. The evaporator 3 is disposed vertically in the air conditioning case 2 to cross an entire sectional area of the air passage in the air conditioning case 2, such that a wall thickness of the evaporator 3 is thin in the vehicle front-rear direction when the air conditioning device 1 is mounted on the vehicle. Therefore, air blown from the blower flows into a front surface of the evaporator 3 extending in the vehicle up-down direction. The evaporator 3 cools air passing therethrough by absorbing evaporation latent heat of refrigerant in a refrigerant cycle from air.

A cold storage unit 5 for storing cold is disposed in the air conditioning case 2 at a downstream air side of the evaporator 3. The cold storage unit 5 includes a plurality of laminated tubes each of which is formed by bonding two thin heat-transmitting plates to have therein a sealed space. The plurality of laminated tubes are bonded by a brazing material or the like to form the cold storage unit 5. A cold storage material such as paraffin is filled within the tubes of the cold storage unit 5.

The heater core 6 is disposed at a downstream air side (vehicle rear side) of the evaporator 3 and the cold storage unit 5 to have a predetermined distance between the cold storage unit 5 and the heater core 6, such that air after passing through the evaporator 3 passes through the heater core 6. The heater core 6 heats air passing therethrough using high-temperature hot water (i.e., engine-cooling water) flowing therein as a heating source.

The heater core 6 is disposed in the air conditioning case 2 at a lower side position, so that a cool air bypass passage 8, through which cool air from the evaporator 3 and the cold storage unit 5 bypasses the heater core 6, is formed above the heater core 6 in the air conditioning case 2. An air mixing door 7 is disposed between the cold storage unit 5 and the heater core 6 to adjust a ratio between an air amount passing through the heater core 6 and an air amount passing through the cool air bypass passage while bypassing the heat core 6. Therefore, the temperature of air to be blown into the passenger compartment can be controlled to a desired temperature. In this embodiment, the air mixing door 7 is formed into a flat plate, for example.

The air mixing door 7 is connected integrally with a rotation shaft disposed horizontally to be roratable with the rotation shaft in the vehicle up-down direction. In the first embodiment, by adjusting the air flow ratio using the air mixing door 7, the temperature of air blown into the passenger compartment can be adjusted. The rotation shaft of the air mixing door 7 is rotatably held in the air conditioning case 2, and one end of the rotation shaft protrudes from the air conditioning case 2 to an outside. The rotation shaft of the air mixing door 7 is connected to an actuator mechanism using a servomotor or a manual operation mechanism, through a link mechanism, so that a rotation position of the air mixing door 7 is adjusted by the actuator mechanism or the manual operation mechanism.

A wall surface extending in the up-down direction is formed integrally with the air conditioning case 2 at a downstream air side position of the heater core 6 to have a predetermined distance between the heater core 6 and the wall surface. Therefore, a warm air passage 9 through which warm air from the heater core 6 passes upwardly is defined by the wall surface. In the air conditioning case 2, warm air from the warm air passage 9 and cool air from the cool air bypass passage 8 are mixed in an air mixing portion 10 so that conditioned air having a predetermined temperature can be obtained.

A defroster opening 11 is opened in the air conditioning case 2 on an upper side of the cool air bypass passage 8 and the air mixing portion 10, at a vehicle front side position. A foot opening 15 is opened in the air conditioning case 2 at a vehicle rear side of the air mixing portion 10, and a face opening is opened in the air conditioning case 2 between the defroster opening 11 and the foot opening 15.

The defroster opening 11 is provided so that conditioned air from the air mixing portion 10 flows into the defroster opening 11. The defroster opening 11 is connected to a defroster air outlet opened into the passenger compartment, through a defroster duct positioned at a vehicle front upper side of the air conditioning case 2. Accordingly, conditioned air can be blown toward an inner surface of a front windshield from the defroster air outlet.

As shown in FIG. 1, the defroster opening 11 is opened and closed by a defroster door 12 formed into a plate like. The defroster door 12 is disposed at an upstream air side of the defroster opening 11 to be rotatably held in the air conditioning case 2 on an upper surface of the air conditioning case 2, disposed approximately horizontally.

The face opening 13 is provided on the upper surface of the air conditioning case 2 at a vehicle rear side from the defroster opening 11. The face opening 13 is connected to face air outlets provided at an upper side in the dashboard through a face duct, so that conditioned air is blown toward the head side (i.e., upper side) of a passenger in the passenger compartment from the face air outlets. The face opening 13 is opened and closed by a face door 14 formed into a plate like. The face door 14 is disposed at an upstream air side of the face opening 11 to be rotatably held in the air conditioning case 2 on an upper surface of the air conditioning case 2.

The foot opening 15 is provided on the upper surface of the air conditioning case 2, at a vehicle rear side from the face opening 9. The foot opening 15 is connected to face air outlets provided at a lower side in the dashboard through a face duct, so that conditioned air is blown toward the foot side (i.e., lower side) of the passenger in the passenger compartment from the foot air outlets. The foot opening 15 is opened and closed by a foot door 16 formed into a plate like. The foot door 16 is disposed at an upstream air side of the foot opening 15 to be rotatably held in the air conditioning case 2 on an upper surface of the air conditioning case 2.

The defroster door 12, the face door 14 and the foot door 16 construct a mode switching member for switching an air outlet mode. The defroster door 12, the face door 14 and the foot door 16 are connected to an actuator mechanism using a servomotor or a manual operation mechanism, through a link mechanism, so that the doors 12, 14, 16 are operatively linked with the actuator mechanism or the manual operation mechanism.

Figure 2:
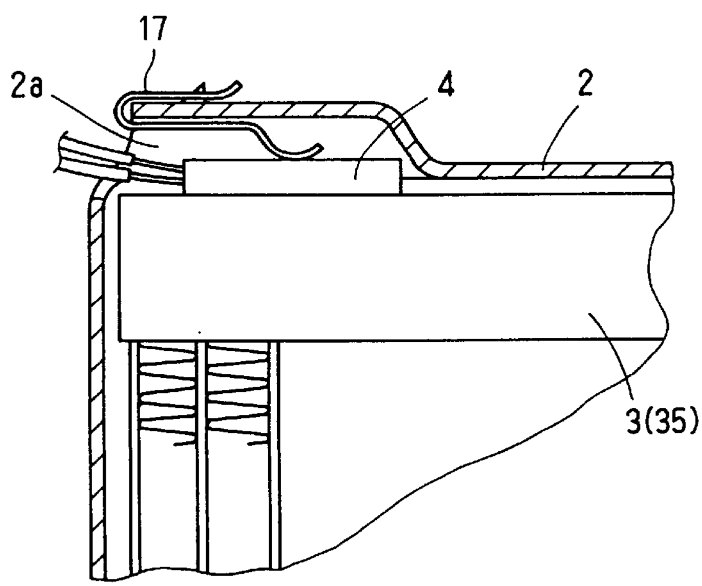
FIG. 2 is a cross-sectional view taken along line II—II in FIG. 1, showing an attachment state of a temperature sensor (temperature detector) according to the first embodiment.

As shown in FIGS. 1 and 2, a temperature sensor 4 made of a thermistor is attached to an upper surface portion of the evaporator 3 within the air conditioning case 2 to detect the temperature of the evaporator 3. The temperature sensor 4 can be used as a temperature detector for detecting the temperature relative to an air temperature flowing from the evaporator 3.

Specifically, a sensor insertion hole 2*a* is provided between the upper surface of the air conditioning case 2 and a top surface of an upper tank 35 of the evaporator 3, and a sensor clamp 17 is attached to the air conditioning case 2 to be inserted into the sensor insertion hole 2*a*. The sensor clamp 17 is formed by a plate spring, for example, so that the temperature sensor 4 press-contacts the evaporator 3 by a slight pressing force of the sensor clamp 17. That is, the temperature sensor 4 is inserted between the sensor clamp 17 and the evaporator 3 by a small pressing force of the sensor clip 17, and is held therebetween to contact the outer surface of the tank 35 of the evaporator 3.

Next, operation of the air conditioning device 1 will be now described. The cold storage unit 5 is cooled by air flowing from the evaporator 3 to be cold-stored. Cool air passing through the cool air bypass passage 8 and warm air from the warm air passage 9 are mixed in the air mixing portion 10 based on the operation position of the air mixing door 7 so that conditioned air having a predetermined temperature can be obtained. Thereafter, conditioned air is blown into the passenger compartment toward a predetermined position based on the opening patterns of the defroster door 12, the face door 14 and the foot door 16.

That is, an air outlet mode such as a face mode, a foot mode, a bi-level mode and a defroster mode can be selected based on the opening patterns of the doors 12, 14, 16. In the face mode, cool air is mainly blown toward the upper side in the passenger compartment through the face opening 13. In the foot mode, warm air is mainly blown toward the lower side in the passenger compartment through the foot opening 15. In the bi-level mode, air is blown from both the face opening 13 and the foot opening 15, simultaneously.

The temperature of the evaporator 3 is detected by the temperature sensor 4 that is disposed to contact the upper tank 35 of the evaporator 3, and the operation of a compressor of the refrigerant cycle or the air to be blown into the passenger compartment can be controlled using the detected evaporator temperature. When a vehicle engine used as a driving source of the compressor is temporally stopped when the vehicle stops, the temperature of air to be blown into the passenger compartment is cooled by the cold storage unit 5.

Figure 3:
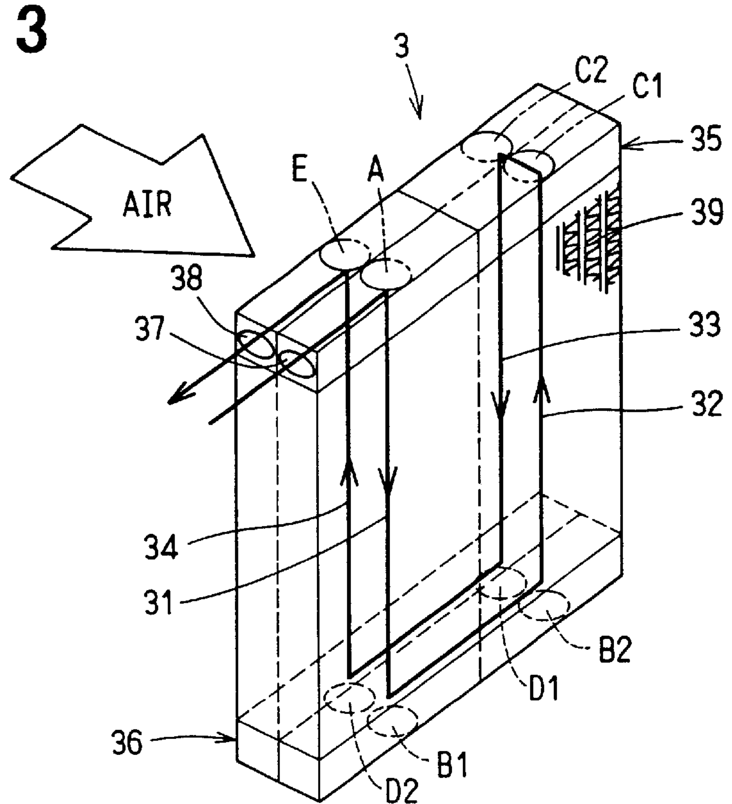
FIG. 3 is a schematic perspective view showing a four-division type evaporator according to the first embodiment.

Next, the structure of the evaporator 3 according to the first embodiment will be now described. As shown in FIG. 3, the evaporator 3 is a four-division type that is partitioned into two parts in the air-flowing direction and is partitioned into two parts in the right-left direction (width direction). The up-down direction of the evaporator 3 positioned in FIG. 3 corresponds to the up-down direction of the evaporator 3 disposed in the air conditioning case 2 shown in FIG. 1. Air blown by the blower unit passes through the evaporator 3 as shown by the arrow in FIG. 3. In the evaporator 3, air passing therethrough is heat exchanged with refrigerant flowing therein.

The evaporator 3 includes plural tubes 31–34 arranged in two lines in the air-flowing direction. Each of the tubes 31–34 is a flat tube having therein a refrigerant passage with a flat sectional shape. The tubes 31–34 are also arranged in the width direction perpendicular to the air-flowing direction. Here, the downstream air-side tubes 31, 32 construct a refrigerant passage of a refrigerant inlet-side core, and the upstream air-side tubes 33, 34 construct a refrigerant passage of a refrigerant outlet-side core.

The evaporator 3 includes the upper tank 35 and a lower tanks 36 which communicate with the tubes 31–34. The upper tank 35 has a refrigerant inlet 37 and a refrigerant outlet 38. From the refrigerant inlet 37, low-temperature and low-pressure refrigerant decompressed in a thermal expansion valve (decompression unit) of the refrigerant cycle flows into the upper tank 35 of the evaporator 3. The refrigerant outlet 38 is connected to a refrigerant suction pipe of the compressor of the refrigerant cycle, so that gas refrigerant evaporated in the evaporator 3 returns to a refrigerant suction side of the compressor. In the first embodiment, for example, the refrigerant inlet 37 and the refrigerant outlet 38 are provided at the same left side in the upper tank 35 of the evaporator 3. As shown in FIG. 3, the refrigerant inlet 37 communicates with a refrigerant inlet tank portion A positioned at a left side of the upper tank 35 on the upstream refrigerant passage, and the refrigerant outlet 38 communicates with a refrigerant outlet tank portion E positioned at the left side of the upper tank 35 on the downstream refrigerant passage.

Tank portions A–E of the upper tank 35 and the lower tank 36 of the evaporator 3 are arranged in two lines in the air-flowing direction in accordance with the arrangement of the tubes 31–34, for distributing refrigerant into or collecting refrigerant from the tubes 31–34. That is, the inlet side tank portions A, B1, B2 and C1 are positioned at the downstream air side, and the outlet side tank portions C2, D1, D2, E are positioned at the upstream air side. Further, the tank portions A, C1, C2 and E of the upper tank 35 are partitioned from each other, in the width direction.

Accordingly, in the refrigerant upstream side passage of the evaporator 3, one side ends (i.e., upper side ends in FIG. 3) of the tubes 31 communicate with the refrigerant inlet tank portion A, and the other side ends (i.e., lower side ends in FIG. 3) of the tubes 31 communicate with the tank portion B1. Similarly, one side ends (i.e., upper side ends in FIG. 3) of the tubes 32 communicate with the tank portion C1, and the other side ends (i.e., lower side ends in FIG. 3) of the tubes 32 communicate with the tank portion B2. On the other hand, in the downstream refrigerant passage of the evaporator 3, one side ends (i.e., upper side ends in FIG. 3) of the tubes 34 communicate with the refrigerant outlet tank portion E, and the other side ends (i.e., lower side ends in FIG. 3) of the tubes 34 communicate with the tank portion D2. Similarly, one side ends (i.e., upper side ends in FIG. 3) of the tubes 33 communicate with the tank portion C2, and the other side ends (i.e., lower side ends in FIG. 3) of the tubes 33 communicate with the tank portion D1.

In addition, partition walls for partitioning adjacent two tank portions in the air flowing direction are disposed to extend in an entire width dimension of the evaporator 3. That is, the partition walls are provided between the tank portions A and E, between the tank portions C1 and C2, between the tank portions B1 and B2, and between the tank portions D1 and D2. In the first embodiment, plural holes are provided in the partition wall between the tank portions C1 and C2 so that the tank portions C1 and C2 communicate with each other.

Plural corrugated fins 39 are disposed between adjacent tubes 31–34 in each arrangement line, to be bonded to flat outer surfaces of the tubes 31–34. In addition, inner fins formed into wave shapes can be disposed within the tubes 31–34.

Next, operation of the evaporator 3 according to the first embodiment will be now described. Low-temperature and low-pressure gas-liquid refrigerant decompressed in the expansion valve of the refrigerant cycle firstly flows into the tank portion A from the refrigerant inlet 37, and is distributed into the plural tubes 31 to flows downwardly through the tubes 31. The refrigerant from the plural tubes 31 is joined into the tank portion B1, and flows from the tank portion B1 into the tank portion B2. Thereafter, the refrigerant is distributed into the plural tubes 32 from the tank portion B2, and passes through the plural tubes 32 upwardly. The refrigerant from the tubes 32 flows into the tank portion C1 from the tubes 32, and further flows into the tank portion C2 through the holes provided in the partition wall. Next, the refrigerant is distributed from the tank portion C2 into the plural tubes 33, passes through the plural tubes 33, and flows into the tank portion D1. Then, the refrigerant flows from the tank portion D1 to the tank portion D2, is distributed into the plural tubes 34 from the tank portion D2, and passes through the tubes 34 upwardly. Thereafter, the refrigerant is joined into the tank portion E, and is discharged to an outside of the evaporator 3 from the refrigerant outlet 38.

On the other hand, air passes through clearances of the core portion of the evaporator 3 as shown by the arrow in FIG. 3. The core portion of the evaporator 3 is constructed by the tubes 31–34 and the corrugated fins 39. While refrigerant passes the tubes 31–34, refrigerant absorbs heat from air to be evaporated, so that air passing through the evaporator 3 is cooled, and the passenger compartment is cooled by the air blown into the passenger compartment.

In the evaporator 3 of the first embodiment, the refrigerant upstream side passage having the refrigerant inlet 37 is arranged at the downstream air side in the air flowing direction, and the refrigerant downstream side passage having the refrigerant outlet 38 is arranged at the upstream air side in the air flowing direction. Further, each of the refrigerant upstream side passage having the refrigerant inlet 37 and the refrigerant downstream side passage having the refrigerant outlet 38 is formed into a meander passage. Accordingly, heat-exchanging performance between refrigerant and air can be effectively improved.

Next, the arrangement position of the temperature sensor 4 in the evaporator 3 will be now described. In the first embodiment, the temperature sensor 4 is disposed on the tank for reducing a space between the evaporator 3 and the cold storage unit 5. Specifically, the temperature sensor 4 is disposed on the upper tank 35, in order to prevent condensed water from covering and contacting the temperature sensor 4. Generally, condensed water generated on the core portion of the evaporator 3 is collected to the lower tank 36, and the temperature sensor 4 is readily exposed by the condensed water when the temperature sensor 4 is attached onto the lower tank 36. If the temperature sensor 4 is exposed by the condensed water, the detected value of the temperature sensor 4 is changed, and the temperature of the evaporator 3 cannot be accurately detected by the temperature sensor 4.

Figure 4:
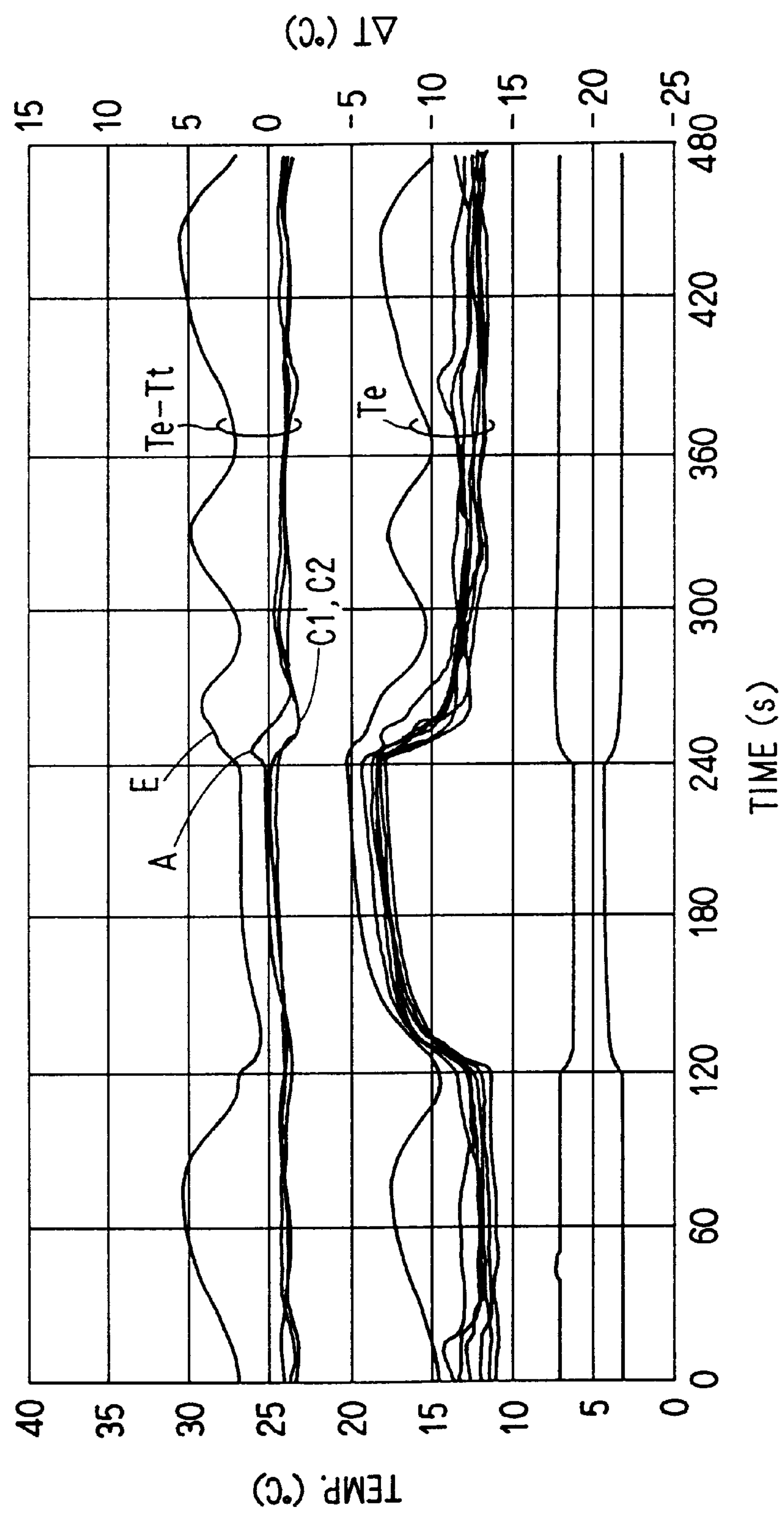
FIG. 4 is a graph for estimating a temperature difference ($\Delta T$) between an air temperature (Te) immediately after passing through the evaporator and a temperature (Tt) of a tank of the evaporator, according to the first embodiment.

In the first embodiment, because the temperature sensor 4 is disposed on the upper tank 35, the temperature sensor 4 can be readily attached with a simple structure. The upper tank 35 of the evaporator 3 is composed of the four tank portions A, C1, C2 and E. Accordingly, a temperature difference between the air temperature Te immediately after passing through the evaporator 3 and the temperature Tt on each tank portion is examined by the inventors of the present application, as shown in FIG. 4. That is, a temperature change in each tank portion A, C1, C2, E of the upper tank 35, and the temperature change of the air temperature Te immediately after passing through the evaporator 3 are studied.

As shown in FIG. 4, the temperature change on the tank portion A is partially different from the temperature change of the air temperature Te. Generally, when the temperature sensor 4 is disposed on the refrigerant inlet tank portion A, the detected temperature may be different, sometimes, in accordance with an operation state of the evaporator 3. On the other hand, generally, the opening degree of the expansion valve is controlled so that the refrigerant in the refrigerant outlet tank portion E has a super-heating degree. Therefore, the outside temperature Tt on the tank portion E is changed to be different from the change of the air temperature Te immediately after passing through the evaporator 3.

On the other hand, the outside temperature Tt on each tank portion C1, C2 is stably changed similar to the change of the air temperature Te immediately after passing through evaporator 3. Therefore, in the tank portions C1, C2, the temperature difference ΔT between the air temperature Te and the outside temperature Tt on the tank portion becomes equal to or lower than 2° C., as shown in FIG. 4. Accordingly, when the temperature sensor 4 is disposed on the tank portions C1, C2, the detected temperature can be accurately used as the evaporator temperature. In addition, the tank portion C2 is positioned at the upstream air side of the tank portion C1 in the air flowing direction. Thus, when the temperature sensor 4 is disposed on the tank portion C1 at the downstream air side, the temperature sensor 4 is hardly affected by the blown air. In this case, the temperature sensor 4 more accurately detects the temperature corresponding to the evaporator temperature.

According to the first embodiment of the present invention, the temperature sensor 4 is disposed on the upper tank 35 to contact the upper tank 35 when the evaporator 3 is mounted on the vehicle. Therefore, the downstream air side space of the evaporator 3 can be effectively used, and the size of the air conditioning device 1 can be reduced. In addition, because the temperature sensor 4 is deposed above the upper tank 35 to contact the upper tank 35, it can prevent temperature sensor 4 from being exposed by the condensed water generated on the core portion of the evaporator 3. Accordingly, the evaporator temperature can be accurately detected by the temperature sensor 4 with a simple attachment structure of the temperature sensor 4.

Further, in the four-division evaporator 3 of the first embodiment, the temperature sensor 4 is disposed on the tank portions C1, C2 positioned in a middle part in the refrigerant passage of the evaporator 3. That is, the temperature sensor 4 is disposed on the tank portions C1, C2, except for the refrigerant inlet tank portion A and the refrigerant outlet tank portion E on which the detected temperature is readily affected in accordance with the operation state of the refrigerant cycle. Accordingly, the temperature of the evaporator 3 can be stably detected using the temperature sensor 4.

Further, in the first embodiment, because the temperature sensor 4 is disposed on the upper tank 35, the cold storage unit 5 can be disposed at a position immediately downstream from the evaporator 3 in the air flowing direction, and the distance between the evaporator 3 and the cold storage unit 5 can be made shorter. Accordingly, when the present invention is applied to the air conditioning device 1 having the cold storage unit 5, the size of the air conditioning device 1 can be effectively reduced.

Figure 5:
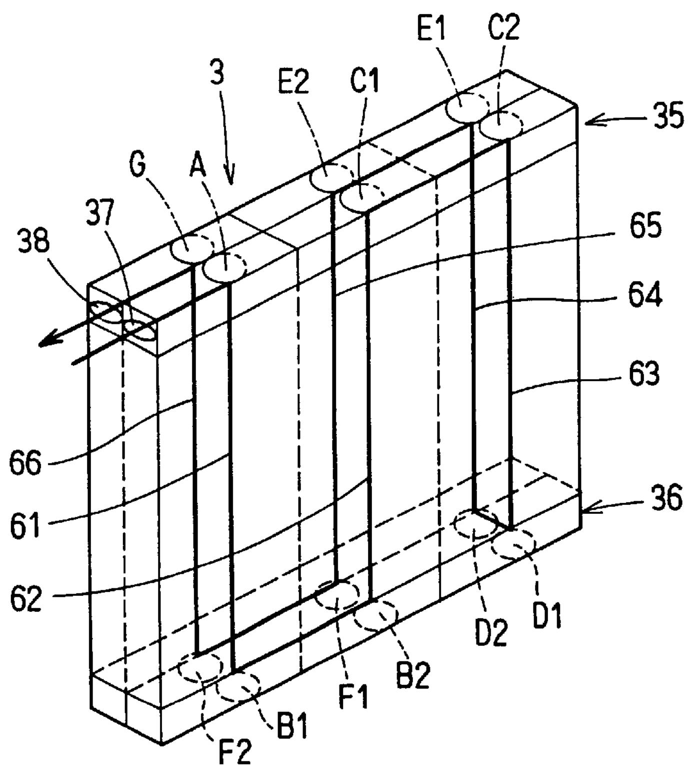
FIG. 5 is a schematic perspective view showing a six-division type evaporator, according to a second embodiment of the present invention.

A second embodiment of the present invention will be now described with reference to FIG. 5. In the second embodiment, the present invention is typically used for a six-division type evaporator 3. In the second embodiment, only the refrigerant passage structure of the evaporator 3 is different from that described in the first embodiment. As shown in FIG. 5, in the second embodiment, tubes 61, 62, 63 positioned on the downstream air side constructs the refrigerant passage of an upstream refrigerant-side core portion, and the tubes 64, 65, 66 positioned on the upstream air side construct the refrigerant passage of a downstream refrigerant-side core portion. Accordingly, refrigerant flowing into the refrigerant inlet 37 passes through the refrigerant inlet tank portion A, the tubes 61, the tank portions B1, B2, the tubes 62, the tank portions C1, C2, the tubes 63, the tank portions D1, D2, the tubes 64, the tank portions E1, E2, the tubes 65, the tank portions F1, F2, the tubes 66 and the refrigerant outlet tank portion G, in this order, and flows out from the refrigerant outlet 38.

Even in this case, the temperature sensor 4 described in the first embodiment is disposed on a tank portion of the upper tank 35 to contact the tank portion, except for the refrigerant inlet tank portion A and the refrigerant outlet tank portion G. That is, the temperature sensor 4 is disposed on any one tank portion, among the tank portions C1, C2, E1 and E2. Alternatively, the temperature sensor 4 can be disposed on the upper tank 35 between adjacent two tank portions C1, C2, E1 and E2. Accordingly, in the six-division type evaporator 3, the temperature of the evaporator 3 can be stably detected using the temperature sensor 4.

Further, when the temperature sensor 4 is disposed on the tank portions C1, C2 positioned at the downstream air side, the detected temperature is hardly affected by the blown air. In addition, when the temperature sensor 4 is disposed on the tank portion C2 that is farthest from the refrigerant inlet 37 and the refrigerant outlet 38, the temperature of the evaporator 3 is more stably detected using the temperature sensor 4.

Figure 6:
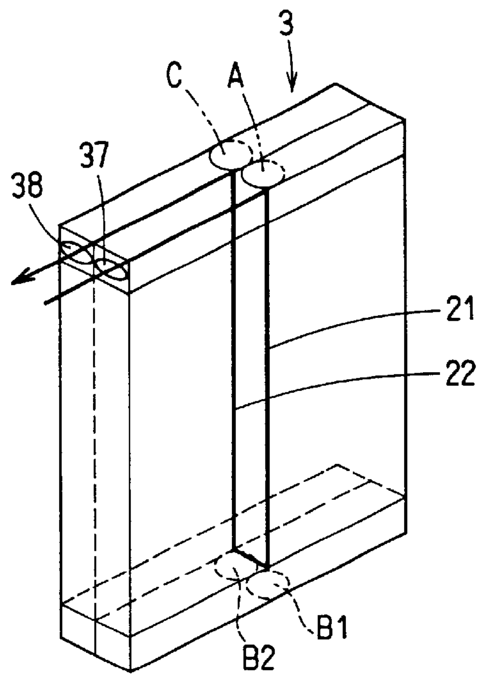
FIG. 6 is a schematic perspective view showing a two-division type evaporator, according to a third embodiment of the present invention.

A third embodiment of the present invention will be now described with reference to FIG. 6. In the third embodiment, the present invention is typically used for a two-division type evaporator 3. In the third embodiment, only the refrigerant passage structure of the evaporator 3 is different from that described in the first embodiment. As shown in FIG. 6, the tubes 21 positioned on the downstream air side construct the refrigerant passage of an upstream refrigerant-side core portion, and the tubes 22 positioned on the upstream air side construct the refrigerant passage of a downstream refrigerant-side core portion. Accordingly, refrigerant flowing into the refrigerant inlet 37 passes through the refrigerant inlet tank portion A, the tubes 21, the tank portions B1, B2, the tubes 22 and the tank portion C, in this order, and flows out from the refrigerant outlet 38.

Even in this case, the temperature sensor 4 described in the first embodiment is disposed on the upper tank 35 to contact the tank portion 35, at a position separated from the refrigerant inlet tank portion A and the refrigerant outlet tank portion G. That is, the temperature sensor 4 is disposed on the upper tank 35 at a downstream air side position to be more separated from the refrigerant inlet 37 and the refrigerant outlet 38. Accordingly, the evaporator temperature can be stably detected using the temperature sensor 4 even in the two-division type evaporator 3.

Figure 7:
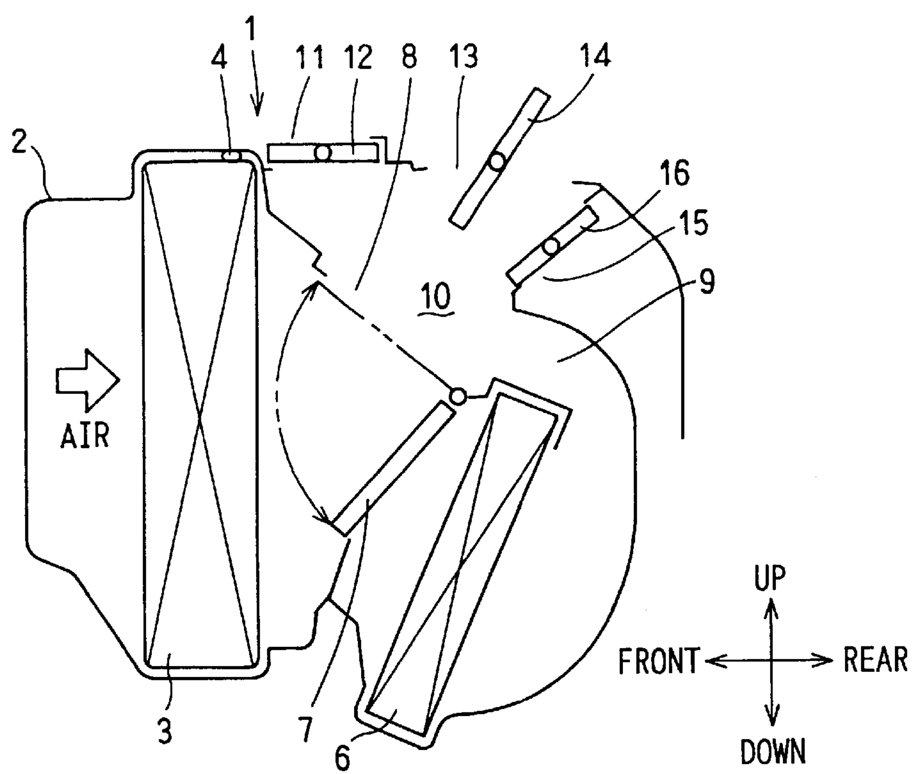
FIG. 7 is a schematic diagram showing an air conditioning device according to a fourth embodiment of the present invention.

A fourth embodiment of the present invention will be now described with reference to FIG. 7. In the above-described first embodiment, the cold storage tank is disposed at a position immediately downstream from the evaporator 3. However, in the fourth embodiment, the present invention is used for an air conditioning device without having the cold storage tank. In the fourth embodiment, the other parts are similar to those of the above-described first embodiment. Accordingly, even in the fourth embodiment, the advantage described in the first embodiment can be obtained.

Figure 8:
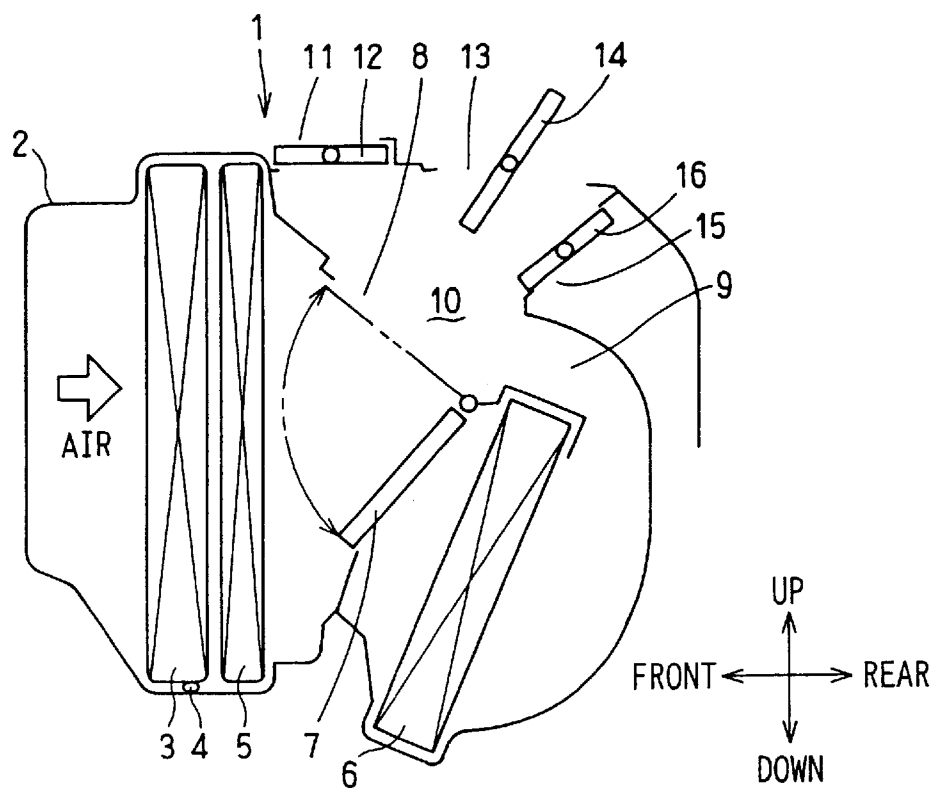
FIG. 8 is a schematic diagram showing an air conditioning device according to a fifth embodiment of the present invention.
Figure 9:
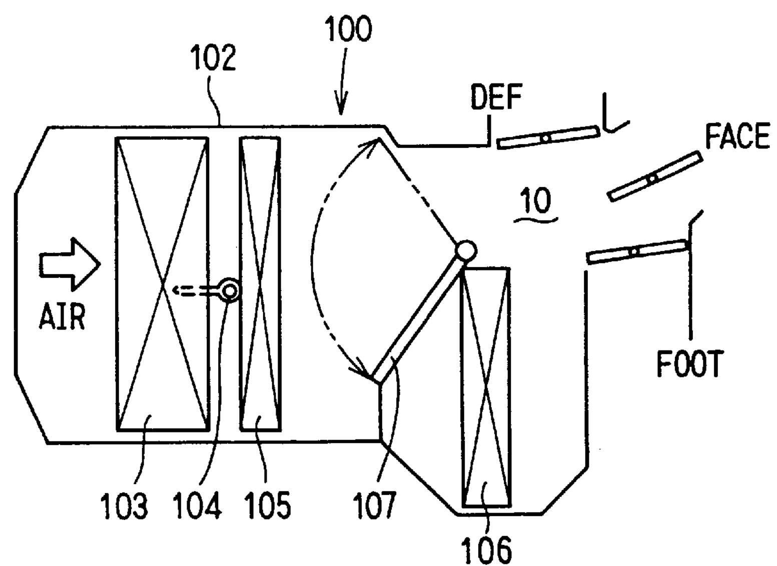
FIG. 9 is a schematic diagram showing an air conditioning device having a cold-storage unit in a vehicle air conditioner of a related art.

A fifth embodiment of the present invention will be now described with reference to FIG. 8. In the fifth embodiment, the temperature sensor 4 is disposed on the lower tank of the evaporator 3 to contact the lower tank. In this case, the temperature sensor 4 is disposed to be not exposed by the condensed water. Accordingly, a structure for preventing the temperature sensor 4 from contacting the condensed water is provided in the fifth embodiment. For example, a guiding member for guiding the condensed water is provided. Even in the fifth embodiment, the downstream air side space of the evaporator 3 can be effectively used, and the size of the air conditioning device 1 can be reduced.

Although the present invention has been fully described in connection with the preferred embodiments thereof with reference to the accompanying drawings, it is to be noted that various changes and modifications will become apparent to those skilled in the art.

For example, in the above-described embodiments of the present invention, the temperature sensor 4 is disposed on the top surface of the upper tank 35 or the bottom surface of the lower tank 36. However, the temperature sensor 4 can be disposed on a side surface of the upper tank 35 or the lower tank 36, at a position more separated from the refrigerant inlet 37 and the refrigerant outlet 38. Further, the temperature sensor 4 can be disposed in the side surface of the upper tank 35 or the lower tank 36 at an upstream air side. In this case, the temperature sensor 4 is disposed to be not exposed by the blown air.

In the above-described first embodiment of the present invention, the evaporator is a laminated type having the upper and lower tanks. However, the structure of the evaporator can be changed arbitrarily. For example, the evaporator may have one side tank, and may be formed into the other shapes.

In the above-described embodiments of the present invention, the present invention is applied for the vehicle air conditioner. However, the present invention can be applied to an air conditioner for the other use such as for a home and a factory, or can be applied to a cooling unit for cooling a heat-generating member.

Such changes and modifications are to be understood as being within the scope of the present invention as defined by the appended claims.

What is claimed is:

1. An air conditioner for a vehicle, comprising:

an evaporator for cooling air passing therethrough by performing heat exchange with refrigerant flowing therein, the evaporator having a core portion for performing the heat exchange and a tank for distributing refrigerant into and for collecting refrigerant from the core portion;

a temperature detector for detecting a temperature of the evaporator, the temperature detector being disposed on the tank;

an air conditioning case defining an air passage through which air flows into a passenger compartment of the vehicle, wherein:

the evaporator is disposed in the air conditioning case to approximately cross an entire sectional area of the air passage; and the temperature detector is disposed between a tank surface of the tank of the evaporator and the air conditioning case in a direction perpendicular to a flow direction of air gassing through the evaporator.

2. The air conditioner according to claim 1, wherein:

the tank is arranged at an upper side of the core portion; and the temperature detector has a surface that directly contacts an upper surface of the tank portion.

3. The air conditioner according to claim 1, wherein:

the evaporator is constructed to be divided into two parts in a flow direction of air passing through the evaporator;

the evaporator has a refrigerant inlet from which refrigerant flows into the evaporator, and a refrigerant outlet from which refrigerant is discharged to an outside of the evaporator; and the temperature sensor is disposed at a position separated from the refrigerant inlet and the refrigerant outlet by a predetermined distance.

4. The air conditioner according to claim 1, further comprising a cold storage unit disposed at a downstream air side of the evaporator to be cooled by the evaporator.

5. The air conditioner according to claim 4, wherein the evaporator and the cold storage unit are disposed to have a clearance therebetween, smaller than a predetermined clearance.

6. The air conditioner according to claim 1, wherein:

the core portion has a plurality of tubes through which refrigerant flows; and the tank is disposed to communicate with the tubes.

7. The air conditioner according to claim 1, wherein the temperature detector directly contacts the tank outside the tank.

8. An air conditioner for a vehicle, comprising:

an evaporator for cooling air passing therethrough by performing heat exchange with refrigerant flowing therein, the evaporator having a core portion for performing the heat exchange and a tank for distributing refrigerant into and for collecting refrigerant from the core portion; and a temperature detector for detecting a temperature of the evaporator, the temperature detector being disposed on the tank, wherein:

the evaporator is constructed to be divided into at least two parts in a flow direction of air passing through the evaporator, and to be divided into at least two parts in a width direction approximately perpendicular to the flow direction of air;

the tank has a first tank portion connected to a refrigerant inlet from which refrigerant flows into the evaporator, a second tank portion from which refrigerant is discharged to an outside of the evaporator to define a refrigerant flow direction, and a third tank portion disposed between the first tank portion and the second tank portion in the refrigerant flow direction; and the temperature sensor is disposed to contact the third tank portion.

* * * * *